United States Patent [19]
Sasaki et al.

[11] Patent Number: 5,568,849
[45] Date of Patent: Oct. 29, 1996

[54] CLUTCH MECHANISM IN POWER DRIVEN SCREWDRIVER

[75] Inventors: Katsuhiko Sasaki; Yoshinori Shibata, both of Anjo, Japan

[73] Assignee: Makita Corporation, Anjo, Japan

[21] Appl. No.: 382,797

[22] Filed: Feb. 2, 1995

[30]  Foreign Application Priority Data

Feb. 3, 1994 [JP] Japan .................................. 6-011813

[51] Int. Cl.⁶ ...................................................... B25B 21/00
[52] U.S. Cl. ........................... 192/34; 192/56.56; 81/429; 81/474
[58] Field of Search .................... 192/34, 56.56, 192/56.6, 56.61; 81/429, 467, 473, 474

[56]  References Cited

U.S. PATENT DOCUMENTS

| | | |
|---|---|---|
| 2,167,749 | 8/1939 | Grohn . |
| 2,196,589 | 4/1940 | Jimerson .......................... 192/56.51 X |
| 2,224,440 | 12/1940 | Lewis ................... 192/56.6 X |
| 2,940,488 | 6/1960 | Riley .......................... 81/429 |
| 3,527,273 | 9/1970 | Falter ......................... 81/429 |
| 4,546,833 | 10/1985 | Berecz et al. ......................... 192/34 X |
| 4,655,103 | 4/1987 | Schreiber et al. . |
| 4,809,572 | 3/1989 | Sasaki . |
| 5,134,909 | 8/1992 | Sasaki . |
| 5,138,916 | 8/1992 | Sato et al. ................................ 81/474 |
| 5,271,471 | 12/1993 | Sasaki . |

FOREIGN PATENT DOCUMENTS

| | | |
|---|---|---|
| 0476999 | 3/1992 | European Pat. Off. . |
| 1573990 | 7/1969 | France . |
| 3637852 | 3/1988 | Germany . |
| 3818924 | 6/1989 | Germany . |

*Primary Examiner*—Charles A. Marmor
*Assistant Examiner*—Saul Rodriguez
*Attorney, Agent, or Firm*—Dennison, Meserole, Pollack & Scheiner

[57]  ABSTRACT

A power driven screwdriver including a housing, a spindle rotatably and axially movably disposed within the housing, a motor for driving the spindle, and a clutch mechanism interposed between the motor and the spindle. The clutch mechanism includes a drive clutch member rotatably driven by the motor, a driven clutch member rotatable with the spindle, and a drive clutch shifting mechanism. The drive clutch shifting mechanism is operable to move the drive clutch member from a first position to a second position spaced from the first position in a forward direction toward the driven clutch member when the driven clutch member is brought to engage the drive clutch member. The drive clutch shifting mechanism is also operable to move the drive clutch member from the second position to the first position when the driven clutch member is brought to be disengaged from the drive clutch member.

12 Claims, 11 Drawing Sheets

NORMAL ROTATIONAL DIRECTION

CLUTCH MECHANISM IN POWER DRIVEN SCREWDRIVER

BACKGROUND OF THE INVENTION

1. Field of the Invention

The present invention relates to a clutch mechanism in a power driven screwdriver for driving and tightening screws.

2. Description of the Prior Art

U.S. Pat. No. 4,655,103 discloses a clutch mechanism in a power driven screwdriver. When a screw has been driven by a predetermined depth, the clutch mechanism of this patent interrupts transmission of rotation from a motor to a spindle so as to stop a tightening operation and to permit an idle rotation of the motor without producing undesirable clutch sounds.

The construction of the clutch mechanism of the above patent will now be explained with reference to FIG. 12 which corresponds to FIG. 2a of this patent.

A clutch mechanism 50 includes a first clutch element 51, a second clutch element 52 and an intermediate clutch element 53. The first clutch element 51 is rotatable relative to a spindle 54 but is fixed in position in an axial direction. The spindle 54 is movable in the axial direction relative to the first clutch element 51. The intermediate clutch element 52 is rotatably and axially movably supported by the spindle 54. The second clutch element 52 is fixed to the spindle 54.

A drive gear 51a is formed on an outer peripheral surface of the first clutch element 51 and is in engagement with a pinion motor (not shown). A cam 51b is formed on a lower portion of the first clutch element 51 and functions as clutch teeth. A cam 53a is formed on an upper portion of the intermediate clutch element 53 for engagement with the cam 51b. An engaging portion 53b is formed on a lower portion of the intermediate clutch element 53. An engaging portion 52a is formed on an upper portion of the second clutch element 52 for engagement with the portion 53b.

A compression coil spring (not shown) interposed between the first clutch element 51 and the intermediate clutch element 53, so that the intermediate clutch element 53 is biased in direction away from the first clutch element 51 or in a direction toward the second clutch element 52.

In operation, the first clutch element 51 and the intermediate clutch element 53 are in engagement with each other, and the intermediate clutch element 53 and the second clutch element 52 are also in engagement with each other until a forward end of a stopper sleeve 55 abuts on a work W into which a screw S is driven. The rotation of the motor is therefore transmitted to the spindle 54 via the clutch mechanism 50, so that the screw S is driven into the work W. Even after the forward end of the stopper sleeve 55 has abutted on the work, the spindle 54 is still rotated to further tighten the screw S, so that the intermediate clutch element 53 and the second clutch element 52 are moved downwardly together with the spindle 54 and that the intermediate clutch element 53 is moved away from the first clutch element 51 which is fixed in position in the axial direction. When the screw S has been driven by a predetermined depth, the intermediate clutch element 53 is disengaged from the first clutch element 51. Simultaneously therewith, the transmission of rotation to the intermediate clutch element 53 is interrupted, so that the rotation of the spindle 54 is stopped. The rotational torque applied to the intermediate clutch element 53 is thus interrupted, and at the same time therewith, the intermediate clutch element 53 is moved by the biasing force of the compression coil spring in a direction away from the first clutch element 51 or in a direction toward the second clutch element. An appropriate space is therefore formed between the first clutch element 51 and the intermediate clutch element 53, so that the first clutch element 51 idly silently rotates.

However, with this prior art clutch mechanism 50, the provision of the intermediate clutch element 53 is essential to attaining an idle rotation of the first clutch element 51. Therefore, the clutch mechanism 50 uses an increased number of parts and is heavy in weight. Additionally, since a space is required for interposition of the intermediate clutch member 53, the power driven screwdriver is long in size. Further, the cam 53a and the engaging portion 53b functioning as clutch teeth must be formed on the upper and lower portions of the intermediate clutch element 53, respectively. Therefore, the intermediate clutch element 53 must have a considerable durability, a wear resistance and a machining accuracy. The manufacturing costs of the clutch mechanism 50 having the intermediate clutch element 53 therefore increase.

SUMMARY OF THE INVENTION

It is, accordingly, an object of the present invention to provide a clutch mechanism in a power driven screwdriver which does not require an internal clutch element.

It is another object of the present invention to provide a clutch mechanism in a power driven screwdriver which enables the power driven screwdriver to have a reduced weight and a shorter length.

It is a further object of the present invention to provide a clutch mechanism in a power driven screwdriver which can be manufactured at lower costs.

According to the present invention, there is provided a clutch mechanism in a power driven screwdriver including a housing, a spindle rotatably and axially movably disposed within the housing, and a motor for driving the spindle, the clutch mechanism interposed between the motor and the spindle comprising:

a drive clutch member rotatably driven by the motor;

a driven clutch member rotatable with the spindle; and drive clutch shifting mechanism operable to move the drive clutch member from a first position to a second position spaced from the first position in a forward direction toward the driven clutch member when the driven clutch member is brought to engage the drive clutch member, the drive clutch shifting mechanism also being operable to move the drive clutch member from the second position to the first position when the driven clutch member is brought to be disengaged from the drive clutch member.

The invention will become more fully apparent from the claims and the description as it proceeds in connection with the drawings.

BRIEF DESCRIPTION OF THE DRAWINGS

FIG. 1 is a front view of a drive gear of a clutch mechanism shown in FIG. 1;

Figure 1:
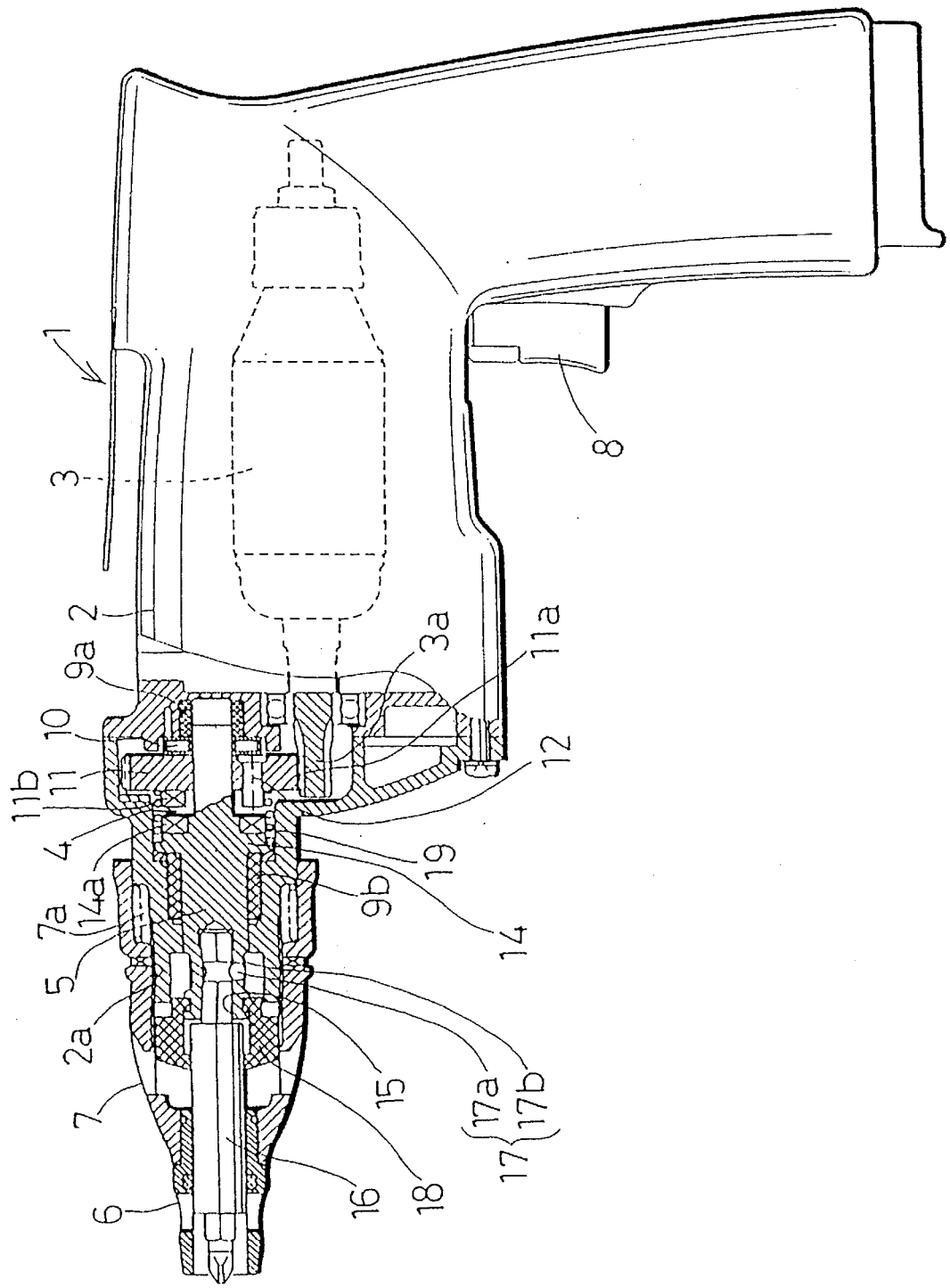
FIG. 1 is a view of a power driven screwdriver according to a first embodiment of the present invention, with a part broken away.

FIGS, 11(a) to 11(e) are views showing sequence various operations of the clutch mechanism of the fourth embodiment; and FIG, 12 is a view showing a conventional clutch mechanism of a power driven screwdriver,

DETAILED DESCRIPTION OF THE PREFERRED EMBODIMENTS

Various embodiments of the present invention will now be explained with reference to the accompanying drawings,
FIRST EMBODIMENT Referring to FIG, 1, there is shown a power driven screwdriver 1 incorporating a clutch mechanism 4 according to a first embodiment of the present invention. The power driven screwdriver 1 has a motor 3 disposed centrally within a housing 2. The motor 3 is started when a trigger 8 is pushed by fingers of an operator. The motor 3 is stopped when the operator releases his fingers from the trigger 8. A pinion gear 3 is formed on an output shaft of the motor 3 and is in engagement with a drive gear 11 which is mounted on a spindle 5 at a position adjacent the rear end (right side end in FIG, 1) of the spindle 5, The spindle 5 is rotatably and axially movably supported within the housing 2 by means of bearings 9a and 9b. The drive gear 11 is rotatably and axially movably supported by the spindle 5, so that the drive gear 11 is rotated about the spindle 5 when the motor 3 is started. A thrust bearing 10 is rotatably fitted on the spindle 5 at a position rearwardly (rightwardly in FIG. 1) of the drive gear 11. The thrust bearing 10 is biased by a compression coil spring 19 through the driver gear 11 to normally abut on an inner wall of the housing 2.

Figure 2:
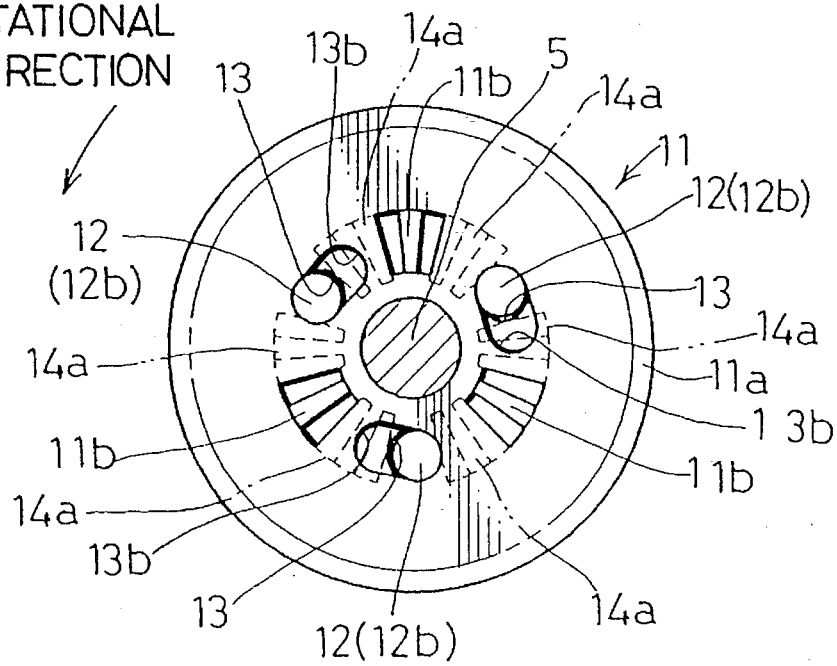
Figure 3:
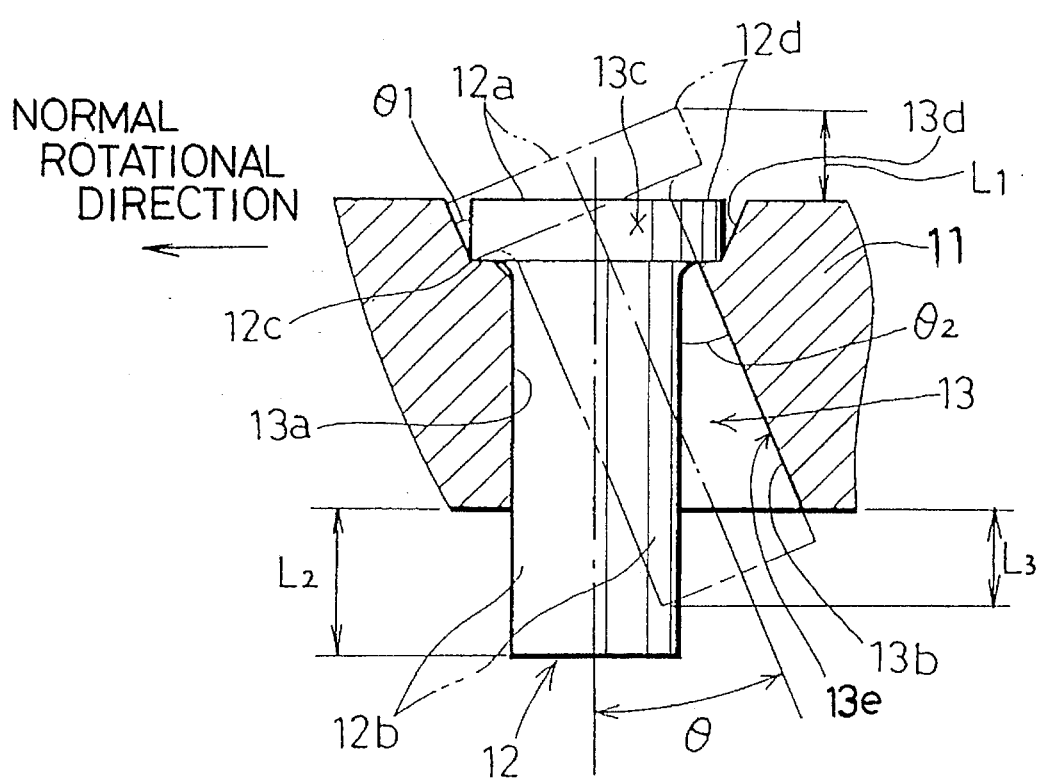
FIG. 3 is a sectional view of the drive gear showing a pin mounted thereon.

First clutch teeth 11b are formed on a front surface (a leftward surface in FIG. 1) of the driver gear 11 and protrude therefrom. In this embodiment, as shown in FIG. 2, the first clutch teeth 11b extend radially at three positions equally spaced from each other in a circumferential direction. Three support holes 13 are formed in the drive gear 11 and are positioned between each two adjacent first clutch teeth 11b. A pin 12 is inserted into each of the support holes 13. As shown in FIG. 3, the pin 12 has a cylindrical shank 12b and a disc-like flange portion 12a formed on one end of the cylindrical shank 12b. The flange portion 12a has a diameter larger than the shank 12b and has the same central axis as the cylindrical shank 12b.

Each of the support holes 13 includes a cylindrical main portion 13a, a subsidiary portion 13b and a circular recess 13c. The main portion 13 extends in an axial direction of the drive gear 11 for slidably receiving the shank 12b of the pin 12. The circular recess 13c is formed on a rear surface (upper surface in FIG. 3) of the drive gear 11 and is positioned coaxially with the portion 13b. The circular recess 13c has a larger diameter than the main portion 13a so as to receive the flange portion 12a of the pin 12. The subsidiary portion 13b communicates with the main portion 13a on a side opposite to a normal rotational direction (indicated by an arrow in FIG. 3) of the drive gear 11. The subsidiary portion 13b has a wall part 13e on the side opposite to the normal rotational direction. The wall part 13e has a configuration corresponding to a part of a cylinder of the main portion 13a and has a central axis extending obliquely relative to the central axis of the main portion 13a at an angle of θ2, so that the pin 2 can be pivoted from a vertical position indicated by solid lines in FIG. 3 to an inclined position indicated by chain lines. Thus, the support hole 13 is gradually enlarged in the direction opposite to the normal rotational direction of the drive gear 11 and in a direction downwardly from the bottom of the circular recess 13c, so that the lower end of the main portion 13a and the lower end of the subsidiary portion 13a together form an elongated opening at the lower surface (front surface) of the drive gear 11.

The circular recess 13c has the same depth as the thickness of the flange portion 12a of the pin 12, so that the rear surface (upper surface in FIG. 3) is positioned flush with the rear surface of the drive gear 11 when the pin 12 is at the vertical position. The circular recess 13c has a conical circumferential wall 13d which is enlarged upwardly in FIG. 3 and which is inclined at an angle of θ1 relative to the vertical direction, so that the flange portion 12a of the pin 12 can be pivoted by the angle of θ1 around a forward end 12c of the bottom edge of the circular recess 13c in the normal rotational direction of the drive gear 11. Here, the angle 81 is determined equal to the angle θ2. Therefore, the pin 12 can be pivoted at an angle of θ (θ=θ1=θ2) which a maximum pivotal angle. Further, when the pin 12 is pivoted to reach the pivoted position, substantially half the circumferential surface of the flange portion 12a abuts on the circumferential wall 13d of the circular recess 13c, while substantially half the lateral surface of the shank 12b abuts on the wall part 13e of the subsidiary portion 13b. The pin 12 at the pivoted position functions as a clutch tooth for engagement with any of second clutch teeth 14a which will be explained later. Thus, the angle θ is determined to be equal to an angle of inclination of engaging surfaces of the first clutch teeth 11b and the second clutch teeth 14 formed in the rotational direction. In this embodiment, θ is determined as θ=θ1=θ2= 23°.

When the pin 12 is at the vertical position, as described above, the rear surface of the flange portion 12a is flush with the rear surface of the driver gear 11. On the other hand, when the pin 12 is at the pivoted position, an upper corner end 12d of the flange portion 12a in the direction opposite to the normal rotational direction is positioned away from the rear surface of the driver gear 11 in a direction rearwardly (upwardly in FIG. 3) from the rear surface of the driver gear 11 by a distance L1. Here, L1 is calculated from the following expression (1):

$$L1 = d \times \sin \theta - t + t \times \cos \theta \qquad (1)$$

d: diameter of the flange portion 12a t: thickness of the flange portion 12a

If θ=23°, L1 is calculated from the following expression (2):

$$L1 = 0.39d - 0.08t \qquad (2)$$

If d=7(mm) and t=2(mm) in the expression (2), L1=2.6(mm)

When the pin 12 is at the vertical position, the shank 12b extends forwardly from the front surface (lower surface in FIG. 3) by a distance L2. The distance L2 is determined to be equal to the height of the first clutch teeth 11b(see FIG. 4(a), FIGS. 5(a), 5(b) and 5(e)). When the pin 12 is at the pivoted position, the shank 12b extends forwardly (downwardly in FIG. 3) from the front surface of the drive gear 11 by a distance L3. As will be seen from FIG. 3, the distance L3 is smaller than the distance L2 (L2>L3). Thus, at the pivoted position, the shank 12b does not extend beyond the clutch teeth 11b(see FIGS. 5(c) and 5(d)). Further, since the diameter of the flange portion 12a is larger than the diameter of the shank 12b, L1 is determined as L1>L2–L3.

Turning to FIG. 1, a flange 14 is formed integrally with the spindle 5 at substantially the central position of the spindle 5 in the axial direction of the spindle 5, so that the flange 14 is positioned forwardly (leftwardly in FIG. 1) of the drive gear 11. The second clutch teeth 14a for engagement with the first clutch teeth 11b are formed on the rear surface (rightward surface in FIG. 1) of the flange 14. The compression coil spring 19 is interposed between the flange 14 and the drive gear 11.

As indicated by chain lines in FIG. 2, the second clutch teeth 14b extend radially at six positions equally spaced from each other in a circumferential direction. The height of the clutch teeth 14b relative to the flange 14 is determined to be equal to the height of the first clutch teeth 11b or to be equal to the distance L2. The positional relationship of the second clutch teeth 14a relative to the first clutch teeth 11b and relative to the pins 12 will now be explained.

Figure 4A:
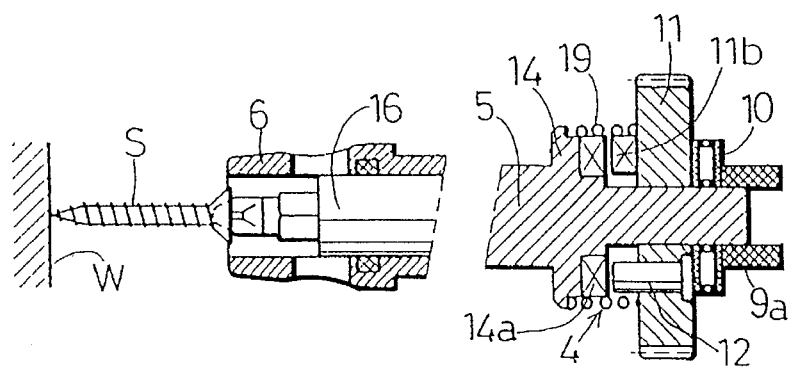
FIGS. 4 (a) to 4(d) are views showing various operations of the power driven screwdriver in sequence.
Figure 4B:
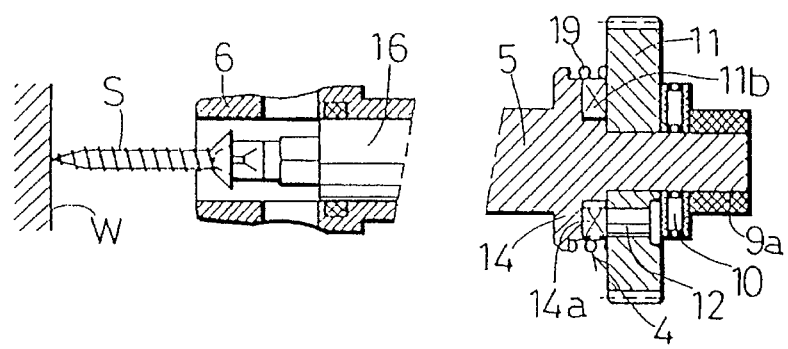
Figure 5A:
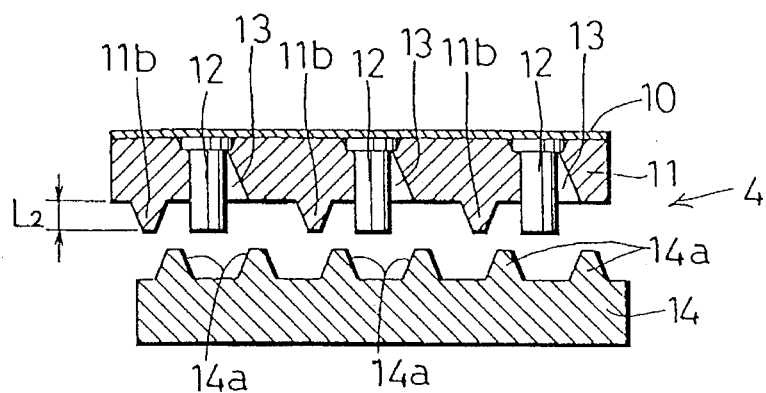
FIGS. 5(a) to 5(e) are views showing various operations of the clutch mechanism in sequence.
Figure 5B:
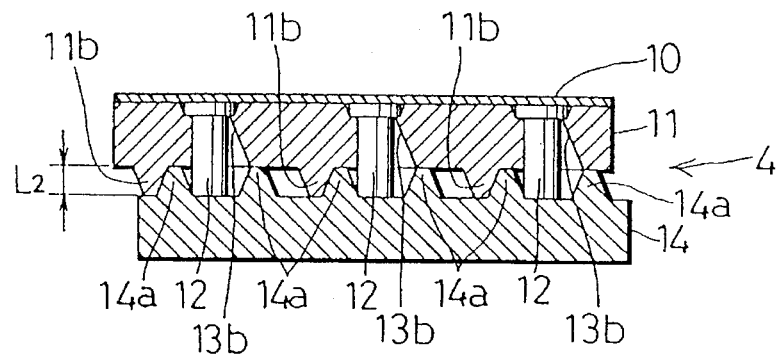

When a screw S is attached to the screwdriver 1 and is pressed on a work W, the spindle 5 as well as the flange 14 is moved toward the drive gear 11 as shown in FIGS. 4(a) and 4(b), and each of the second clutch teeth 14a enters between one of the first clutch teeth 11b and its adjacent pin 12 as shown in FIGS. 5(a) and 5(b) which correspond to FIGS. 4(a) and 4(b), respectively. In the state shown in FIG. 4(b) and FIG. 5(b), the pins 12 as well as the first clutch teeth 11b are in abutment on the flange 14, and the pins 12 are still at the vertical position. The first clutch teeth 11b as well as the pins 12 are not in engagement with the second clutch teeth 14a at this stage.

Figure 4C:
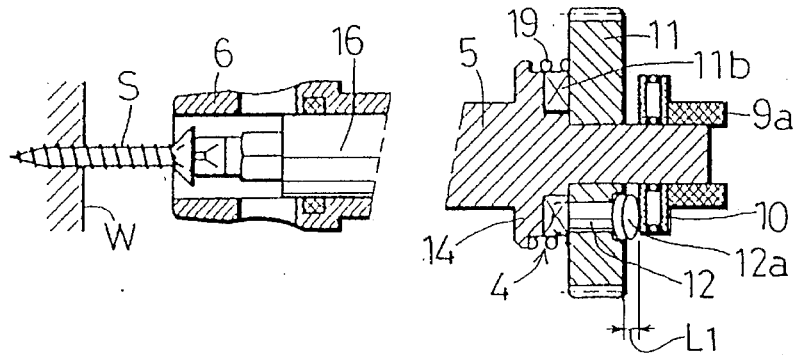
Figure 5C:
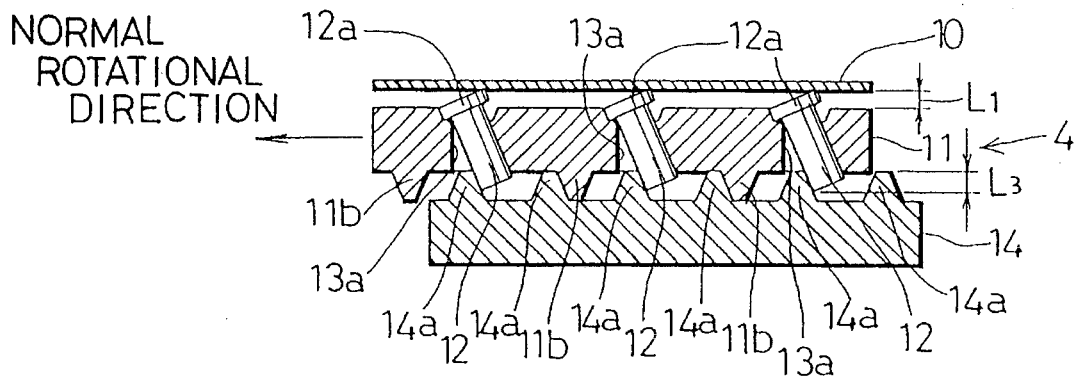

When the drive gear 11 is rotated relative to the flange 14 in the normal rotational direction, the pins 12 are inclined to reach the pivoted position through abutment on their corresponding second clutch teeth 14a and are brought to engage the second clutch teeth 14a as shown in FIGS. 4(c) and FIG. 5(c). At this stage, the first clutch teeth 11b are also brought to engage their corresponding second clutch teeth 14a.

Thus, the positional relationship of the second clutch teeth 14a relative to the first clutch teeth 11b and the pins 12 is determined such that the second clutch teeth 14a are brought to engage the first clutch teeth 11b at the same time as the pins 12 are pivoted through abutment on the second clutch teeth 14a and are brought to engage the same.

With the construction as described above, the first clutch teeth 11b, the pins 12 and the second clutch teeth 14 constitute the clutch mechanism 4 which functions as a silent clutch as will be explained later.

Turning to FIG. 1, an axial hole 15 is formed on a forward end of the spindle 5. A driver bit 16 has a rear end inserted into the axial hole 15, so that the driver bit 16 is axially movable relative to the spindle 5 but is rotatable with the spindle 5. The housing 2 has a threaded forward end 2a, and an adjust sleeve 7 is in engagement with the threaded forward end 2a. A stopper sleeve 6 is detachably mounted on the forward end of the adjust sleeve 7 and receives the driver bit 16 therewithin. The axial position of the stopper sleeve 6 relative to the housing 2 can therefore be adjusted by rotating the adjust sleeve 7 so as to determine the driving depth of the screw S. The stopper sleeve 6 can be fixed at an appropriate position in the axial direction. A compression coil spring 7a is interposed between the rear portion of the adjust sleeve 7 and the housing 2, so that the adjustment of the position of the stopper sleeve 6 can be smoothly reliably performed without being influenced by vibrations. A stopper mechanism 17 includes steel balls 17a and relief springs 17b and is disposed within the axial hole 15 of the spindle 5 so as to prevent the driver bit 16 from being accidentally removed from the spindle 5. A dust prevention ring 18 is mounted within the adjust sleeve 7 so as to prevent any dust from entering the housing 2 via the adjust sleeve 7.

The operation of the clutch mechanism 4 will now be explained with reference to FIGS. 4(a) to 4(d) and FIGS. 5(a) to 5(d) corresponding to FIGS. 4(a) to 4(d), respectively.

FIGS. 4(a) to 4(d) show various operations in sequence of the clutch mechanism 4. In the state of FIG. 4(a), the screw S attached to the driver bit 16 is in abutment on the work W, but no pressing force is applied to the work W via the screwdriver 1. Thus, the flange 14 of the spindle 5 is positioned away from the drive gear 11, so that the first clutch teeth 11b and the second clutch teeth 14a are not in engagement with each other, and so that the pins 12 are maintained at the vertical position. Therefore, the clutch mechanism 4 is interrupted as is best shown in FIG. 5(a).

When the screwdriver 1 is further moved toward the work W against the biasing force of the compression coil spring 19, as shown in FIG. 4(b), the stopper sleeve 16 is moved forwardly together with the housing 2. However, the driver bit 16 as well as the spindle 5 is maintained in position. In other words, the spindle 5 is moved rearwardly relative to the housing 2 and the stopper sleeve 6, so that the flange 14 is pressed on the drive gear 11. At this stage, as described above, each of the second clutch teeth 14a enters between one of the first clutch teeth 11b and its adjacent pin 12, and the pins 12 as well as the first clutch teeth 11b are in abutment on the flange 14. However, the pins 12 are still at the vertical position, and the first clutch teeth 11b as well as the pins 12 are not in engagement with the second clutch teeth 14a in the normal rotational direction (leftward direction in FIG. 5(a)). Thus, the clutch mechanism 4 is still interrupted.

The trigger 8 is then pushed by the operator to start the motor 3, so that the drive gear 11 is rotated and that the rotation of the drive gear 11 is transmitted to the spindle 5 via the clutch mechanism 4. At this stage, as shown in FIG. 5(c), the drive gear 11 is rotated relative to the flange 14 from the position shown in FIG. 5(b) as indicated by an arrow in FIG. 5(c), so that the second clutch teeth 14a positioned in the normal rotational direction (leftward direction in FIG. 5(c)) of their corresponding pins 12 are moved relative to the drive gear 11 in the direction opposite to the normal rotational direction (rightward direction in FIG. 5(c)). The front ends (lower ends in FIG. 5(c)) of the pins 12 are then pushed rightwardly in the direction opposite to the normal rotational direction, so that each of the pins 12 is pivoted about its lower corner end 12c in a counterclockwise direction in FIG. 5(c) to reach the pivoted position. At the pivoted position, as described previously, substantially half the circumferential surface of the flange portion 12a abuts on the circumferential wall 13d of the circular recess 13c, while substantially ha If the lateral surface of the shank 12b abuts on the wall part 13e of the subsidiary portion 13b. Thus, the pins 12 are brought to engage the corresponding second clutch teeth 14a, so that the clutch mechanism 4 is connected and so that the rotation of the drive gear 11 is transmitted to the spindle 5.

Additionally, at the pivoted position, the upper corner end 12d of the flange portion 12a of the pin 12 extends rearwardly of the drive gear 11 by the distance L1, so that a reaction force is produced to push the drive gear 11 as well as the flange 14 and the spindle 5 forwardly relative to the thrust bearing 10 which is in abutment on the inner wall of the housing 2. Actually, the screwdriver i is then lifted.

Further, at the same time when the pins 12 are brought to engage the corresponding second clutch teeth 14a by the relative rotation between the drive gear 11 and the flange 14 as described above, the clutch teeth 11b are brought to engage their corresponding clutch teeth 14a positioned rightwardly of the pins 12 in FIG. 5(b). Thus, the clutch mechanism 4 transmits rotation of the drive gear 11 to the spindle 5 through engagement of both the pins 12 and the first clutch teeth 11b with the second clutch teeth 14a.

Figure 4D:
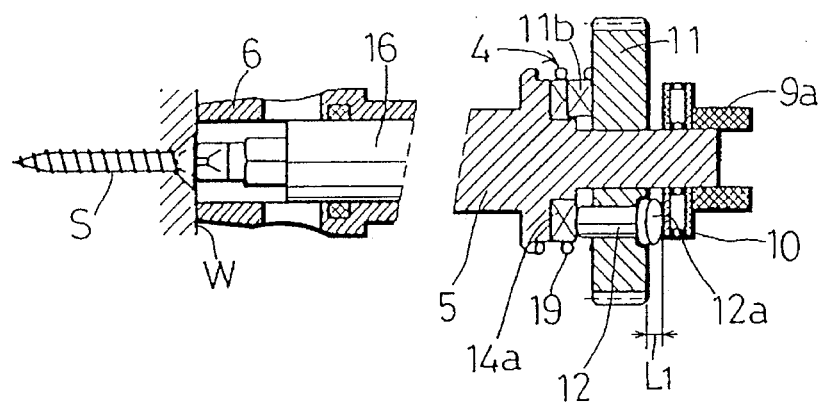
Figure 5D:
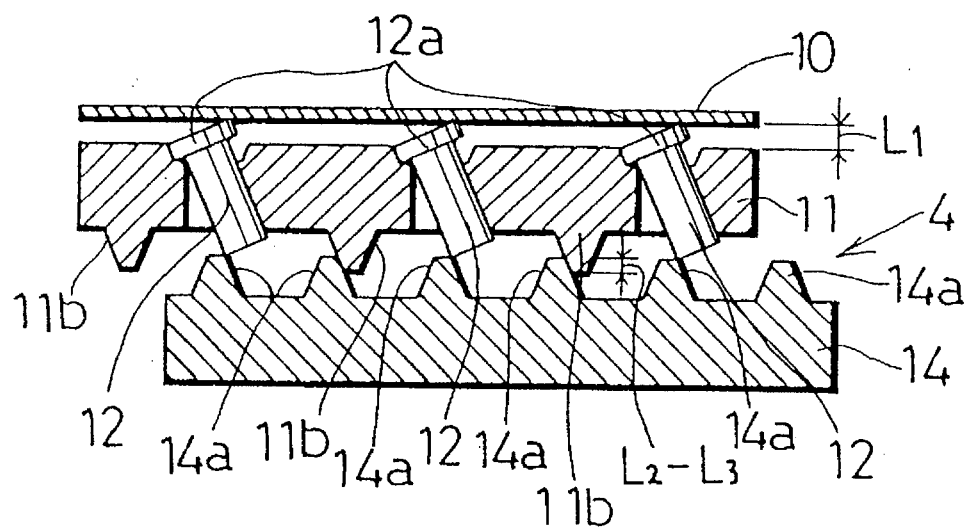

As the screw S is thus driven into the work W by rotation of the spindle 5, the forward end of the stopper sleeve 6 abuts on the work W. Thereafter, the screw W is further driven into the work W by a little amount, so that the driving operation of the screw S is completed as shown in FIG. 4(d). Thus, although the stopper sleeve 6 as well as the housing 2 cannot be moved further after the stopper sleeve 6 has abutted on the work W, the spindle 5 is further moved forwardly by the rotational torque applied to the spindle 5. More specifically, due to a cam function between inclined engaging surfaces of the second clutch teeth 14a and their corresponding inclined engaging surfaces of the first clutch teeth 11b and the pins 12, a force is produced to move the flange 14 or the spindle 5 forwardly away from the drive gear 11 as the screw W is driven into the work W after abutment of the stopper sleeve 6 on the work W. This may result in that the depth of engagement between the second clutch teeth 14a and the pins 12 as well as the first clutch teeth 11b becomes shallower. Therefore, when the screw S has been completely driven as shown in FIG. 4(d) and 5(d), the second clutch teeth 14a are disengaged from the pins 12. However, at this stage, the first clutch teeth 11a are still in engagement with their corresponding second clutch teeth 14a as will be best seen from FIG. 5(d). As explained previously, when the pin 12 is at the vertical position, the shank 12b extends from the front surface of the drive gear 11 by the distance L3 which is smaller than the distance L2 at the pivoted position, and the distance L2 is equal to the height of the first clutch teeth 11b. This means that the protruding distance L3 of the pin 12 at the pivoted position is smaller than the height of the first clutch teeth 11b. Therefore, in the state of FIGS. 4(d) and 5(d), the first clutch teeth 11b and the second clutch teeth 14a are in engagement with each other by the depth of (L2–L3).

Although the first clutch teeth 11b and the second clutch teeth 14a are still maintained in engagement with each other after the second clutch teeth 14a are disengaged from the pins 12, such engagement between the first clutch teeth 11b and the second clutch teeth 14a is instantly released. Upon disengagement of the second clutch teeth 14a from the pins 12, the pins 12 instantly recover their vertical position by the biasing force of the compression second clutch teeth 14a but also causes the creation of the gap by the distance L4 between the first clutch teeth 11b and the second clutch teeth 14a and between the pins 12 and the second clutch teeth 14a.

Consequently, although the drive gear 11 is still rotated, no interference is caused between the first clutch teeth 11b and the second clutch teeth 14a and between the pins 12 and the second clutch teeth 14a, so that the clutch mechanism 4 is brought to a silent idle condition.

As described above, with the clutch mechanism 4 of this embodiment, the silent idle condition can be attained without incorporating any intermediate member corresponding to the intermediate clutch element 53 which has been essential to the conventional clutch mechanism. Therefore, no space is required for such an intermediate member, resulting in that the power driven screwdriver 1 incorporating the silent clutch mechanism 4 of this embodiment is short in its whole length. Further, the first clutch teeth 11b and the second clutch teeth 14a are formed on only one side of the drive gear 11 and on only one side of the flange 14, respectively, and therefore, the clutch mechanism 4 of this embodiment can be manufactured without seriously considering the durability, the wear resistance and the machining accuracy, as compared with the conventional clutch having the intermediate clutch element 53, so that the manufacturing costs can be reduced.

Additionally, when any of the pins 12 has been worn, it is only necessary to change the worn pin 12 to new one but it is not necessary to change the driver gear 11, so that the maintenance costs can be reduced. In case of the conventional clutch mechanism, the intermediate clutch 53 itself must be changed even if only the clutch teeth formed on one side have been worn, and therefore, the maintenance costs are increased.

Further, since both the pins 12 and the first clutch teeth 11b engage the second clutch teeth 14b for transmitting rotation, reliable transmission can be attained. Furthermore, the loads applied to the pins 12 can be reduced during transmission, so that the durability of the pins 12 can be increased.

Although three pins 12 are incorporated in this embodiment, the number of the pins 12 can be selectively determined. For example, two pins 12 may be incorporated, or more than three pins 12 may be incorporated if sufficient spaces can be provided for the pins 12. On the other hand, the number of the second clutch teeth 14a must be determined in response to the number of the pins 12 such that all the pins 12 are simultaneously pivoted in order to provide a sufficient strength or a sufficient transmission efficiency of the clutch mechanism 4.

Although in the clutch mechanism 4 of the first embodiment, both the pins 12 and the first clutch teeth 11b engage the second clutch teeth 14a for transmitting rotation, the first clutch teeth 14a may be omitted if the pins 12 are sufficient to transmit necessary torque for driving the screw S.

Second to fourth embodiments of the present invention will now be explained. These embodiments are modifications of the first embodiment, and therefore, parts that are the same as those in the first embodiment are given like reference numerals and their description will not be repeated.

SECOND EMBODIMENT

The second embodiment of the present invention will now be explained with reference to FIGS. 6(a) and 6(b). A clutch mechanism 20 of the second embodiment has substantially the same construction as the first embodiment but does not include clutch teeth corresponding to the first clutch teeth 11b of the first embodiment for the reason set forth in the last paragraph of the description of the first embodiment.

Thus, in the clutch mechanism 20 of this embodiment, a drive gear 11 includes only three pins 12 as clutch teeth. The flange 14 includes the same second clutch teeth 14a as the first embodiment.

Figure 6A:
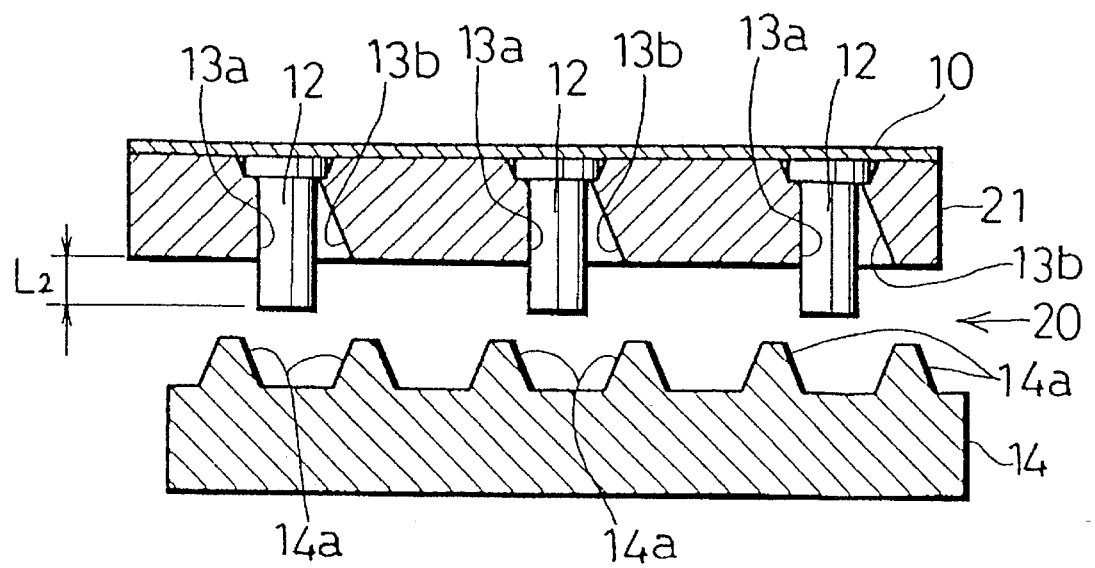
FIGS. 6(a) and 6(b) are views showing operations of a clutch mechanism according to a second embodiment of the present invention.
Figure 6B:
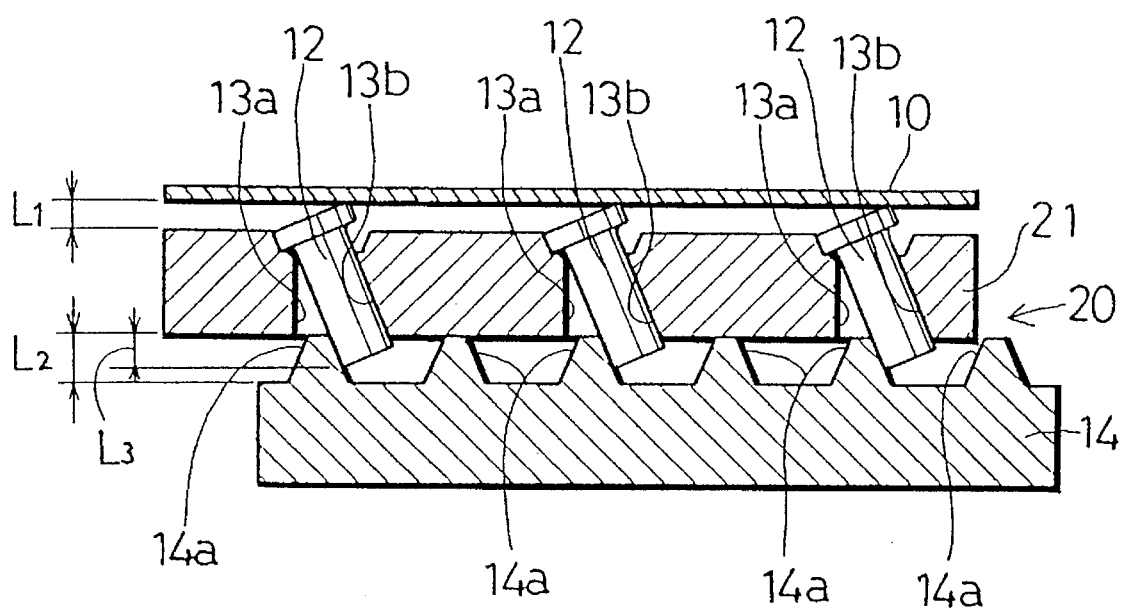

As shown in FIG. 6(a), when the spindle 5 or the flange 14 is not pressed on the drive gear 21, each of the pins 12 is at the vertical position. When the screwdriver 1 is pressed on the work W, the flange 14 is pressed on the drive gear 21, so that each two second clutch teeth 14a enter between two adjacent pins 12. When the motor 3 is started to rotate the drive gear 21, as shown in FIG. 6(b), the drive gear 21 rotates relative to the flange 14 in the normal rotational direction (leftward direction in FIG. 6(b)), so that the forward end (lower end in FIG. 6(a)) of the shank 12b is pushed by the corresponding second clutch tooth 14a and is pivoted from the vertical position. Then, the rotation of the drive gear 21 is transmitted to the spindle 5 through engagement between three pins 12 and their corresponding three second clutch teeth 14a.

When the screw S has been completely driven, the second clutch teeth 14a are brought to disengage from the pins 12. Then, the pins 12 instantly return to the vertical position by the biasing force of the spring 19, while the drive gear 21 is retracted by the biasing force of the spring 19 by the distance L1 so as to be pressed on the thrust bearing 10 or so as to be moved away from the flange 14. Since the pins 12 are thus disengaged and since the drive gear 21 is thus moved by the distance L1, in the same manner as the first embodiment, a gap by the distance L4 (see FIG. 5(e)) is created between the pins 12 and the second clutch teeth 14a. Consequently, the clutch mechanism 20 is brought to a silent idle condition.

Thus, with the second embodiment, similar to the first embodiment, the silent idle condition of the clutch mechanism 20 can be obtained without incorporating an intermediate member corresponding to the intermediate clutch element of the conventional clutch mechanism. Additionally, since the second invention does not include the first clutch teeth 11b as the first embodiment, the clutch mechanism 20 can be manufactured at lower costs and is simple in construction as compared with the first embodiment.

Although six second clutch teeth 14a are incorporated in the second embodiment, three second clutch teeth 14a equally spaced in the circumferential direction of the flange 14 are sufficient to perform a proper function for transmitting rotation.

THIRD EMBODIMENT

A third embodiment of the present invention will now be described with reference to FIGS. 7(a), 7(b) and 7(c).

The third embodiment is a modification of the second embodiment and corresponds to the second embodiment when the second embodiment incorporates a pair of subsidiary portions 13b formed on both sides of the support hole 13 in the rotational direction.

Thus, a drive gear 31 of this embodiment includes support holes 32 each having a circular recess 32a and a pair of subsidiary portions 32b. The circular recess 32a serves to receive the flange portion 12a of the pin 12. The subsidiary portions 32b are formed on both sides of each support hole 32 in the normal rotational direction (leftward in FIGS. 7(a)) of the drive gear 31 and in the direction opposite to the normal rotational direction (rightward in FIG. 7(a)), respectively. The subsidiary portions 32b are thus symmetrically disposed in the rotational direction of the drive gear 31 with respect to the central axis of the circular recess 32a, so that the subsidiary portions 32b are inclined at the same angles as their corresponding engaging surfaces of the second clutch tooth 14a, respectively, and so that the support hole 32 is enlarged in a forward direction (downward direction in FIG. 7(a)).

In contrast, each support hole 13 of the first and second embodiment has only one subsidiary portion 13 formed on the side opposite to the normal rotational direction of the drive gear 11.

The support hole 32 of the third embodiment permits pivotal movement of the pin 12 both in the normal rotational direction of the drive gear 31 and in the direction opposite thereto, so that the drive gear 31 can transmit rotation to the spindle 5 both in the normal rotational direction and the direction opposite thereto. To this end, in this embodiment, a reversible motor is incorporated as the motor 3, and a change-over switch (not shown) is provided for switching the rotational direction of the motor 3 between a normal rotational direction and a reverse rotational direction.

The operation of the third embodiment will now be explained.

Figure 7A:
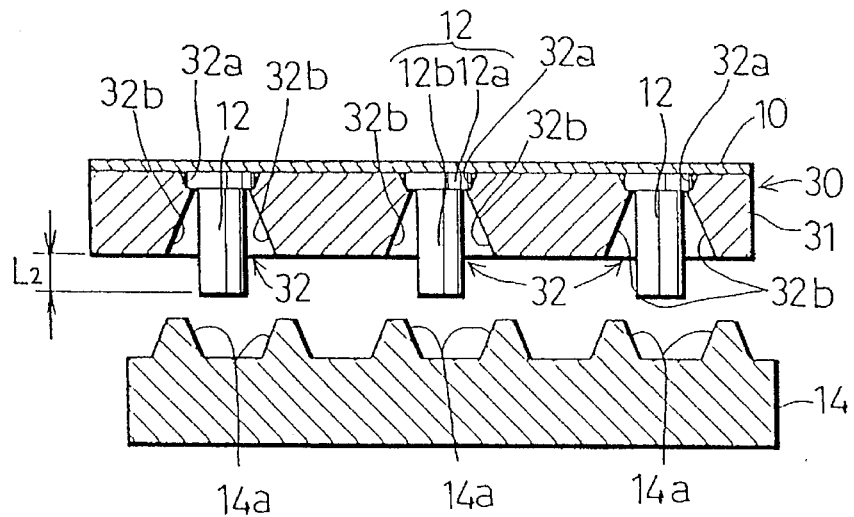
FIGS. 7(a) to 7(c) are views showing in sequence various operations of a clutch mechanism according to a third embodiment of the present invention.
Figure 7B:
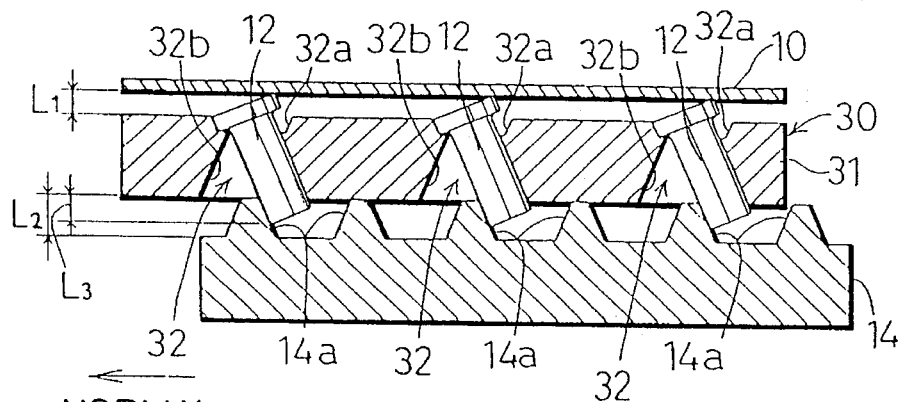
Figure 7C:
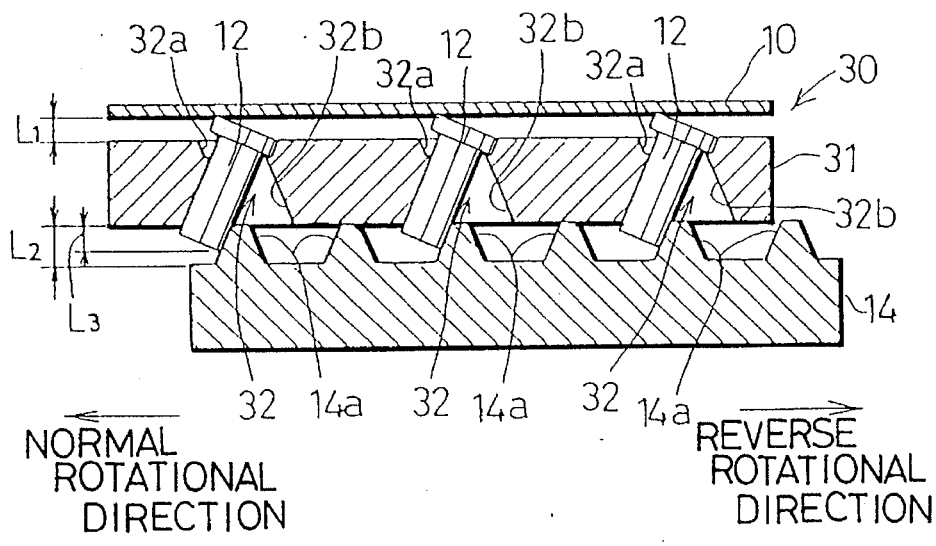

When the screw S mounted on the driver bit 16 is not pressed on the work W, the flange 14 is not pressed toward the drive gear 31, so that the pins 12 are maintained at the vertical position as shown in FIG. 7(a).

When the screw S is pressed on the work W by pressing the screwdriver 1 toward the work W, the flange 14 is pressed on the drive gear 31, so that each of the pins 12 enters between two adjacent second clutch teeth 14a (see FIG. 5(b) of the first embodiment).

When the trigger 8 is operated to start the motor 3 with the change-over switch being switched for the normal rotational direction of the motor 3, the drive gear 31 is rotated in the normal rotational direction (leftward direction in FIG. 7(a). With such rotation of the drive gear 31, the second clutch teeth 14a each positioned in the rotational direction (leftward direction in FIG. 7(a)) of their corresponding pins 12 are moved in the reverse rotational direction relative to those pins 12, so that each of the pins 12 is pressed on one of the subsidiary portions 32b (right side one in FIG. 7(a)) of the corresponding support hole 32. Consequently, each of the pins 12 is pivoted to a first pivoted position as shown in FIG. 7(b).

These operations are substantially the same as the first and second embodiments.

On the other hand, in order to drive an inversely threaded screw, the trigger 8 is operated to start the motor 3 with the change-over switch being switched for the reverse rotation, so that the drive gear 31 is rotated in the reverse rotational direction (rightward direction in FIG. 7(a)). In this case therefore, the second clutch teeth 14a each positioned the reverse rotation direction in (rightward direction in FIG. 7(a)) of their corresponding pins 12 are moved in the normal rotational direction relative to those pins 12, so that each of the pins 12 is pressed on the other of the subsidiary portions 32b (left side one in FIG. 7(a)) of the corresponding support hole 32. Consequently, each of the pins 12 is pivoted to a second pivoted position opposite to the first pivoted position as shown in FIG. 7(c). The inversely threaded screw is therefore driven into the work W. When the screw has been spring 19 which biases the drive gear 11 toward the thrust bearing 10 such that the distance L1 between the drive gear 11 and the thrust bearing 10 becomes zero or such that the upper corner end 12d of the flange portion 12a of each of the pins 12 returns toward the circular recess 13c. The pins 12 therefore return from the pivoted position to the vertical position by the biasing force of the spring 19 upon releasing of the pressing force of the second clutch teeth 14a.

Figure 5E:
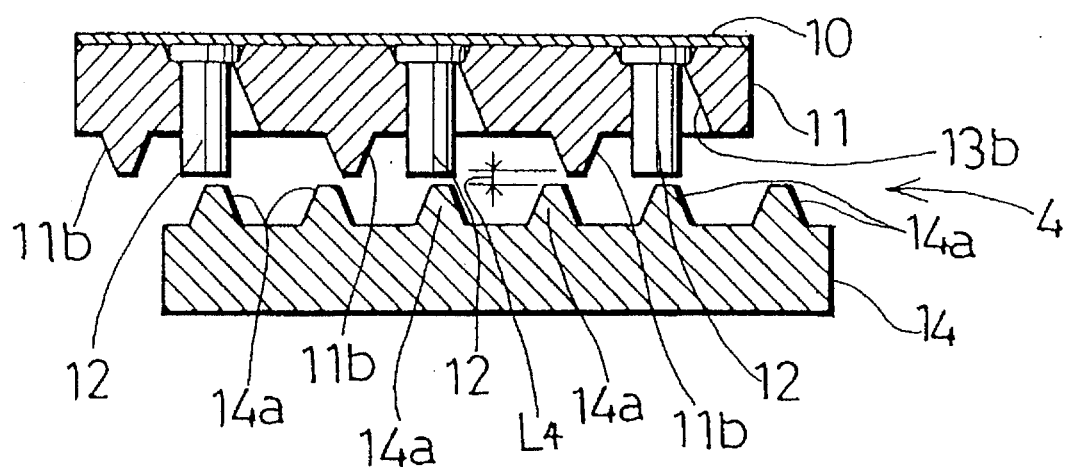

At the same time when the pins 12 return the vertical position, the drive gear 11 is pressed on the thrust bearing 10 or retracts by the distance L1 in a direction away from the flange 14, so that the first clutch teeth 11b are disengaged from the second clutch teeth 14a as shown in FIG. 5(e). Here, when the drive gear 11 is thus retracted by the distance L1, the protruding distance of the forward end of each of the pins 12 increases by a distance L2–L3. Therefore, a gap having a distance L4 (L4=L1–(L2–L3)) is produced between the forward end of each of the pins and the second clutch teeth 14a since L1>L2–L3 as described previously. The same gap having the distance L4 is also produced between the first clutch teeth 11b and the second clutch teeth 14a. Thus, the retraction of the drive gear 11 by the distance L1 causes not only the disengagement between the first clutch teeth 11b and the completely driven into the work W after the stopper sleeve 6 has abutted on the work W, in the same manner as the driving operation of the normal screw S, the pins 12 are disengaged from the second clutch teeth 14a and return from the second pivoted position to the vertical position. Further, the drive gear 31 is retracted to create a gap having the distance L4, so that the silent idle condition of the clutch mechanism 4 can be attained.

Thus, with this embodiment, the clutch mechanism 4 is operable to provide the silent idle condition for both driving operations of the normal screw S and the inversely threaded screw.

FOURTH EMBODIMENT

The fourth embodiment of the present invention will now be described with reference to FIG. 8 to FIG. 11(e).

Figure 8:
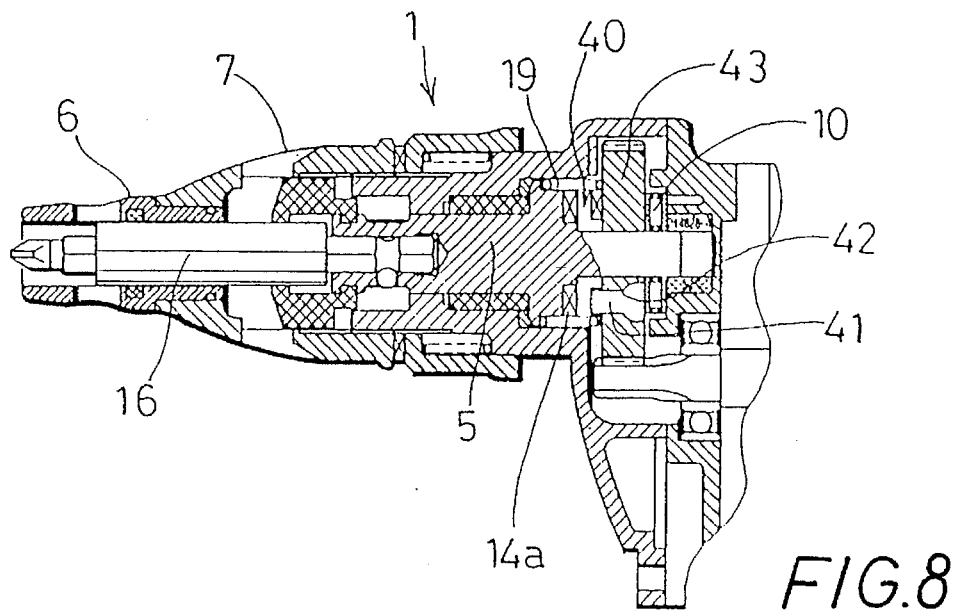
FIG. 8 is a sectional view of the essential parts of a power driven screwdriver incorporating a clutch mechanism according to a fourth embodiment of the present invention.
Figure 9:
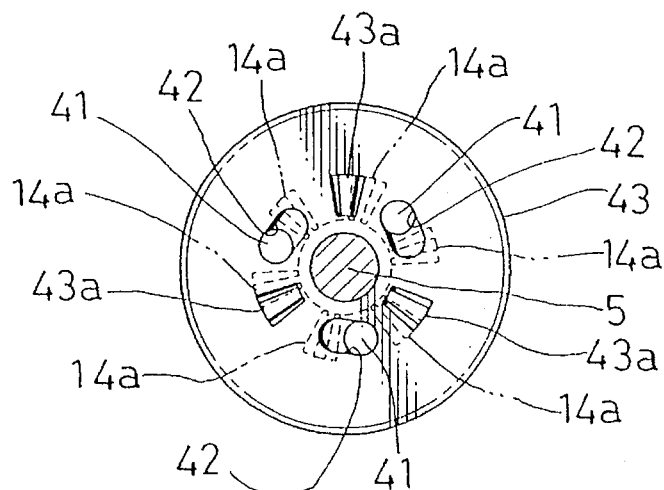
FIG. 9 is a front view of a drive gear of the clutch mechanism shown in FIG. 8.

A clutch mechanism 40 of this embodiment is shown in FIG. 8 in a view assembled into the power driven screwdriver 1. The clutch mechanism 40 is different from the first embodiment in the configuration of the pins and the support holes.

Figure 10:
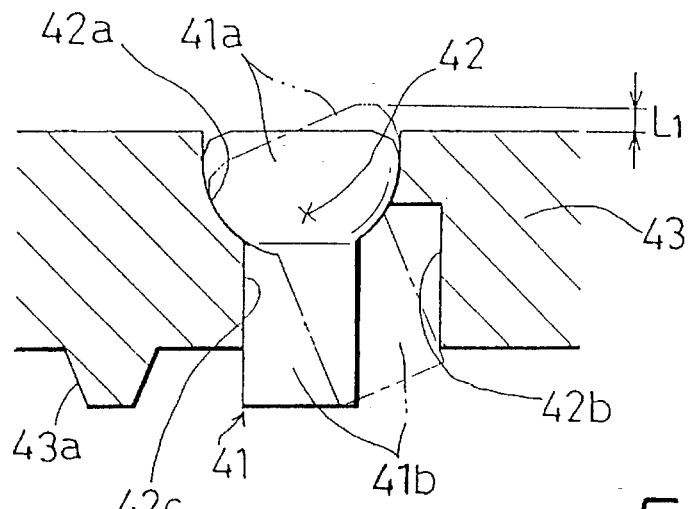
FIG. 10 is a sectional view of the drive gear showing a pin mounted thereon.
Figure 11A:
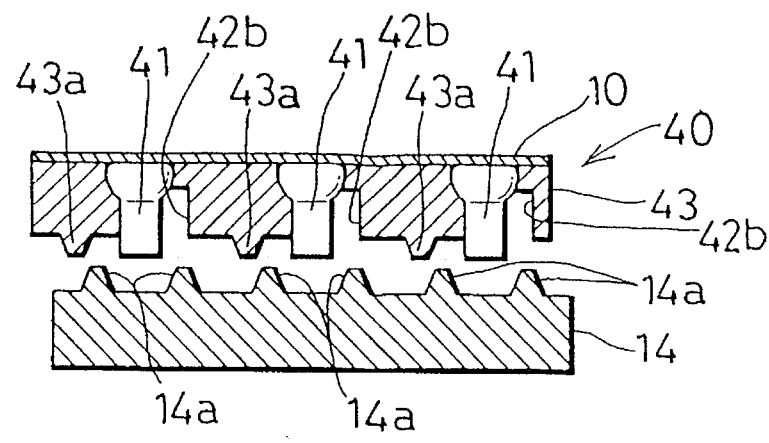

As shown in FIGS. 10 and FIG. 11(a), the clutch mechanism 40 of this embodiment has pins 41 each having a head portion 41a and a shank 41b. The head portion 41a has a hemispherical configuration having a flat upper surface and a curved lateral surface. The shank 41b has a cylindrical configuration and extends downwardly from the bottom of the head portion 418 where the apex of the hemisphere is positioned. The size of the shank 41b is the same as the shank 12b of the pin 12 of the first to third embodiments.

As shown in FIG. 10, a drive gear 43 of the clutch mechanism 40 has support holes 42 for receiving the pins 41. Each of the support holes 42 includes a hemispherical recess 42a, a main hole 42c and a subsidiary hole 42b connected to the main hole 42c. The hemispherical recess 42a has the same diameter as the head portion 41a of the pin 41 for receiving the same. The main hole 42c extends downwardly from the hemispherical recess 42a for receiving the shank 41b of the pin 41. The subsidiary hole 42b is formed on one side (right side in FIG. 10) of the main hole 42c in the direction opposite to the normal rotational direction of the drive gear 43. The subsidiary hole 42b has a configuration corresponding to a part of a cylinder and is opened at a front surface of the drive gear 43, so that the 41 can be pivoted from a vertical position to a pivoted position in a counterclockwise direction in FIG. 10. At the vertical position, the shank 41b is positioned vertically as indicated by solid lines in FIG. 10. At the pivoted position, the shank 41b abuts on the peripheral edge of the subsidiary hole 42b opened at the front surface of the drive gear 43. During the pivotal movement of the pin 41, the head portion 41a slidably contacts a spherically curved wall of the hemispherical recess 42 such that substantially the whole lateral surface of the head portion 41a are maintained to contact the spherically curved wall of the hemispherical recess 42a. Thus, the head portion 41a is received by the hemispherical recess in a surface-to-surface contact relationship, and therefore, the durability of the pin 41 as well as the spherical curved wall of the hemispherical recess 42a can be improved, so that a greater torque can be transmitted. In contrast, the pin 12 of the first to third embodiments is pivoted about the lower corner end 12c of the flange portion 12a, and the flange portion 12a is supported by the inner wall of the circular recess 13c in a point-to-point contact or line-to-line contact relationship during the pivotal movement.

As shown in FIG. 11(a), the drive gear 43 has first clutch teeth 43a which are the same as the clutch teeth 11b of the first embodiment.

The operation of the clutch mechanism 40 of this embodiment is substantially the same as the first embodiment and will now be explained with reference to FIGS. 11(a) to 11(e).

In the state shown in FIG. 11(a), the screwdriver 1 is not pressed toward the work W, and the drive gear 43 and the flange 14 of the spindle 5 is separated from each other by the compression coil spring 19, so that each of the pins 41 is maintained at the vertical position.

Figure 11B:
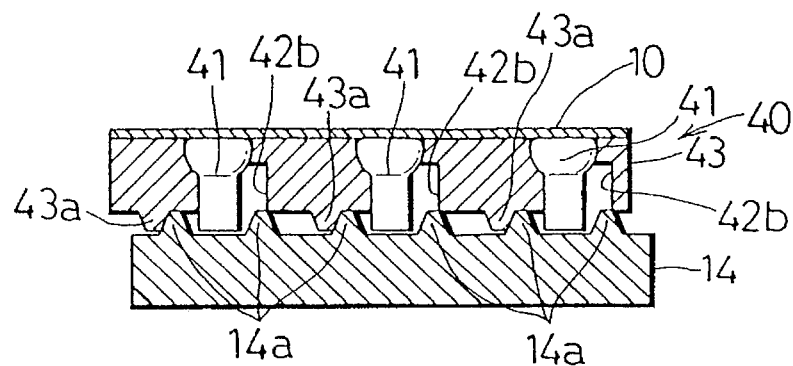

When the screwdriver 1 is pressed toward the work W, the flange 14 is pressed on the drive gear 43, so that each of the pins 41 enters between two adjacent second clutch teeth 14a as shown in FIG. 11(b).

Figure 11C:
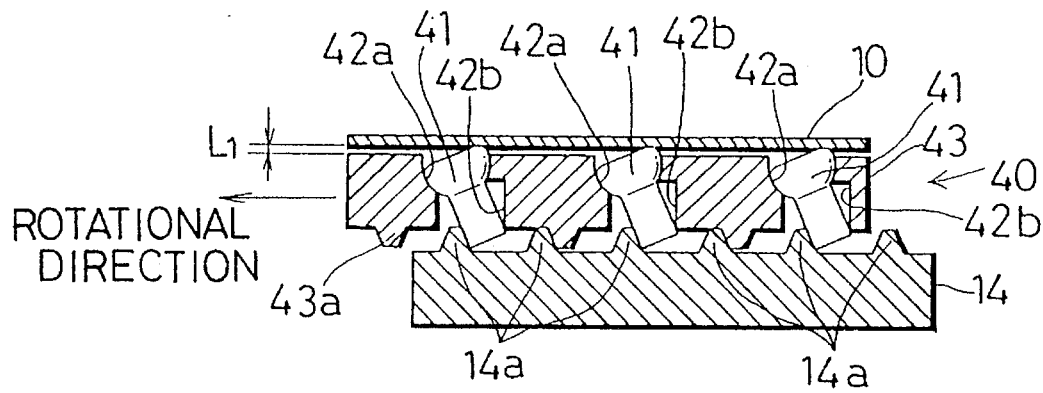

Then, the trigger 8 is operated to start the motor 3 so as to rotate the drive gear 43. Immediately after starting the motor 3, the driver gear 43 is moved relative to the flange 14 in the normal rotational direction as shown in FIG. 11(c). The second clutch teeth 14a are therefore moved relative to the drive gear 43 in the direction opposite to the normal rotational direction (rightward direction in FIG. 11(c)), so that the front end of the shank 41b of each of the pins 41 are pushed by their corresponding second clutch teeth 14a. Consequently, the pins 41 are pivoted to the pivoted position, and at the same time therewith, the first clutch teeth 43a as well as the pins 41 are brought to engage the second clutch teeth 14a, so that the rotation of the drive gear 43 is transmitted to the spindle 5 via the flange 14 so as to drive the screw S.

Figure 11D:
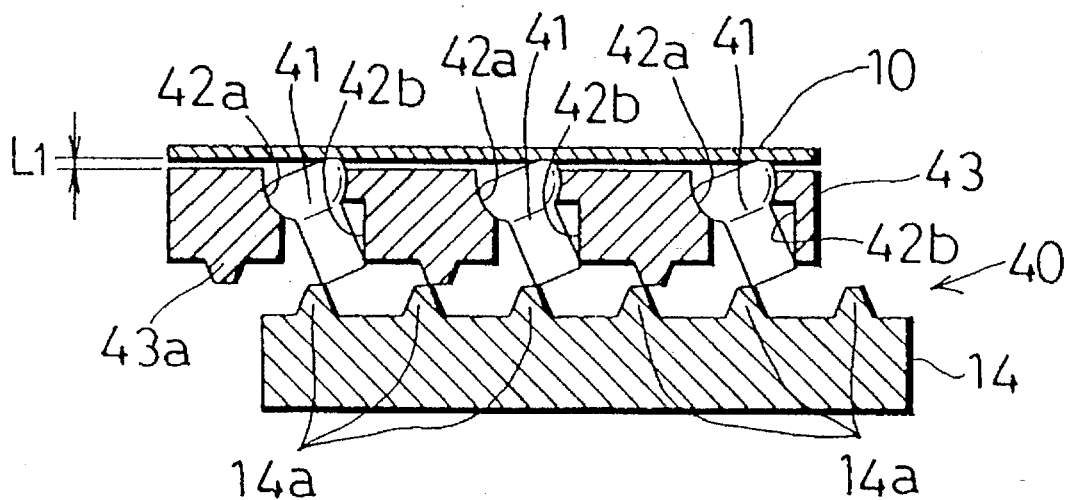

As the screw S is thus driven, the stopper sleeve 6 abuts on the work W. Thereafter, the spindle 6 is further moved forwardly to further drive the screw S, and the engaging depth between the second clutch teeth 14a and the pins 41 as well as the first clutch teeth 43a becomes shallower. When the screw S has been completely driven, the second clutch teeth 14a are disengaged from the pins 41 as shown in FIG. 11(d).

Figure 11E:
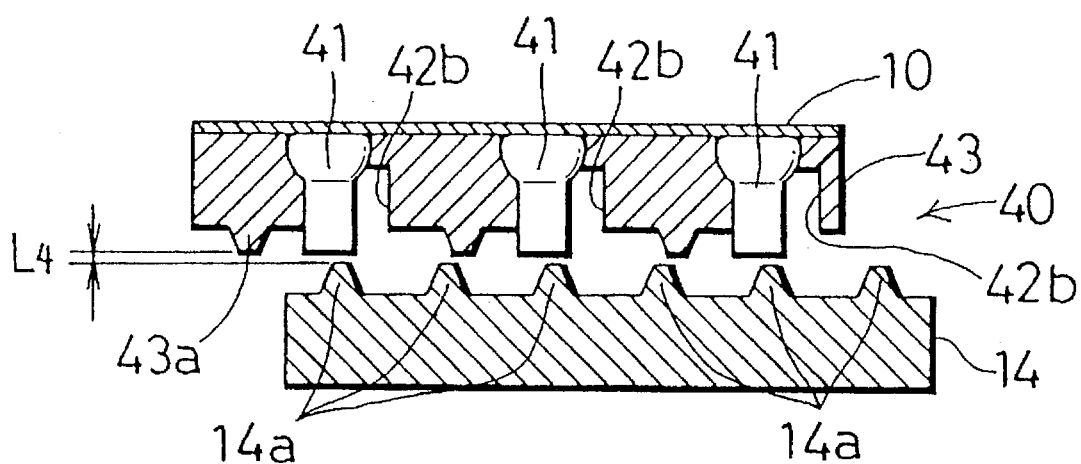
Figure 12:
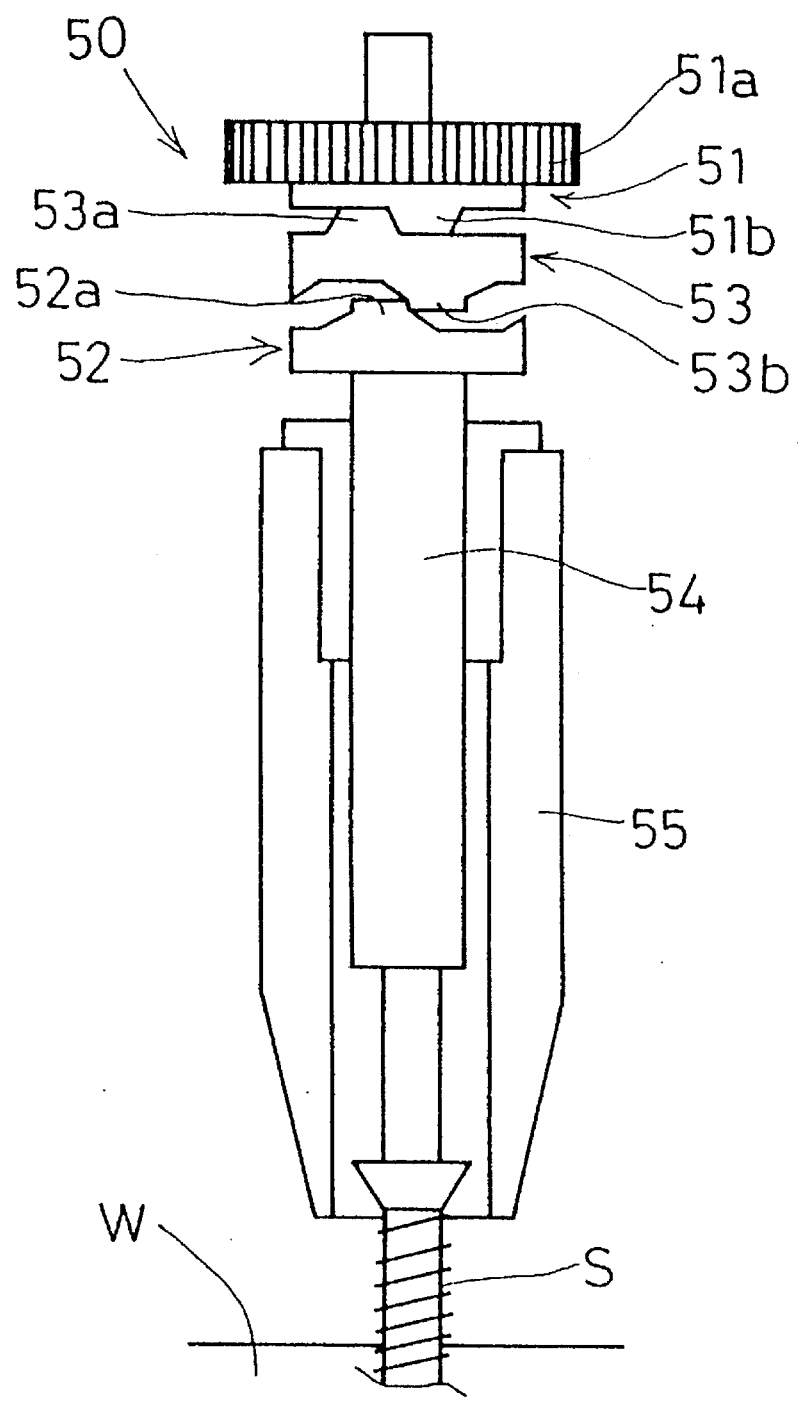

When the pins 41 are thus disengaged from the second clutch teeth 14a, the pins 41 instantly return to the vertical position by the biasing force of the compression coil spring 19 as shown in FIG. 11(e). At the same time therewith, the drive gear 43 is retracted by the distance L1 to abut on the thrust bearing 10. Thus, a space having the distance L4 is created between the second clutch teeth 14a and the pins 41 as well as the first clutch teeth 14a, so that the clutch mechanism 40 is brought to a silent idle condition. In this embodiment, the second clutch teeth 14a are disengaged from the pins 41 at the same time they are disengaged from the pins 41.

Here, similar to the second embodiment, the first clutch teeth 14a can be omitted to perform transmission of rotation through only engagement between the pins 41 and the second clutch teeth 43a. Further, similar to the third embodiment, a pair of the subsidiary portions 42b can be provided on both sides in the rotational direction, so that the screwdriver 1 can be used for driving both the normal screw S and the inversely threaded Screw.

In the above embodiments, at the vertical position, the shank 12b of the pin 12 and the shank 41b of the pin 41 extend forwardly from the drive gear 11 and the drive gear 43, respectively, by the distance L2 which is equal to the height of their corresponding first clutch teeth 11b and 43a. The distance L2 however may be determined to be grater than the height of the first clutch teeth 11b by a little distance, practically by about 0.1 to 0.3 mm. With such determination, when the flange 14 of the spindle 5 is moved toward the drive gear 11 or 43 with the drive gear 11 or 43 being rotated, the shank 12b or 41b contacts any of the second clutch teeth 14a before the first clutch teeth 11b or 43a contact the same, so that smooth engagement of the clutch can be obtained.

Additionally, the peripheral edge of the front end of the shank 41b or the shank 41b may be chamfered, so that the peripheral edge may contact the engaging surface of the second clutch teeth 14a in line-to-line contact relationship. This may improve the durability of the pin 12 or 41.

While the invention has been described with reference to preferred embodiments thereof, it is to be understood that modifications or variation may be easily made without departing from the spirit of this invention which is defined by the appended claims.

What is claimed is:

1. In a power driven screwdriver including a housing, a spindle rotatably and axially movably disposed within the housing, and a motor for driving the spindle, a clutch mechanism interposed between the motor and the spindle comprising:

a drive clutch member rotatably driven by a motor and movable in an axial direction of the spindle between a first position and a second position positioned forwardly of said first position;

a driven clutch member rotatable with the spindle; and drive clutch shifting means operable to move said drive clutch member from said first position to said second position spaced from said first position in a forward direction relative to said driven clutch member when said driven clutch member is brought to engage said drive clutch member, said drive clutch shifting means being also operable to move said drive clutch member from said second position to said first position when said driven clutch member is brought to be disengaged from said drive clutch member;

drive clutch shifting means includes biasing means and at least one pin having a longitudinal axis;

said pin being mounted on said drive clutch member and being movable between a vertical position and an inclined position, said longitudinal axis of said pin at said vertical position being substantially in parallel to an axis of the spindle, and said longitudinal axis of said pin at said inclined position being inclined relative to the axis of the spindle in the rotational direction of said drive clutch member;

said biasing means normally maintaining said pin at said vertical position and maintaining said drive clutch member at said first position;

said pin being movable from said vertical position to said inclined position against the biasing force of said biasing means so as to move said drive clutch member from said first position to said second position when said pin abuts on said driven clutch member in the rotational direction of said drive member; and said driven clutch member has a rear surface confronting said drive clutch member and having a plurality of clutch teeth formed thereon, said pin at said inclined position serves as a clutch tooth engageable with the clutch teeth of said driven clutch member for transmitting rotation of said drive clutch member to said driven clutch member.

2. In a power driven screwdriver including a housing, a spindle rotatably and axially movably disposed within the housing, and a motor for driving the spindle, a clutch mechanism interposed between the motor and the spindle comprising:

a drive clutch member rotatably driven by a motor and movable in an axial direction of the spindle between a first position and a second position positioned forwardly of said first position;

a driven clutch member rotatable with the spindle; and drive clutch shifting means operable to move said drive clutch member from said first position to said second position spaced from said first position in a forward direction relative to said driven clutch member when said driven clutch member is brought to engage said drive clutch member, said drive clutch shifting means being also operable to move said drive clutch member from said second position to said first position when said driven clutch member is brought to be disengaged from said drive clutch member;

drive clutch shifting means includes biasing means and at least one pin having a longitudinal axis;

said pin being mounted on said drive clutch member and being movable between a vertical position and an inclined position, said longitudinal axis of said pin at said vertical position being substantially in parallel to an axis of the spindle, and said longitudinal axis of said pin at said inclined position being inclined relative to the axis of the spindle in the rotational direction of said drive clutch member;

said biasing means normally maintaining said pin at said vertical position and maintaining said drive clutch member at said first position;

said pin being movable from said vertical position to said inclined position against the biasing force of said biasing means so as to move said drive clutch member from said first position to said second position when said pin abuts on said driven clutch member in the rotational direction of said drive member;

said drive clutch member includes at least one support hole for pivotally receiving a pin;

and further including an abutting member on which said drive clutch member abuts at said first position so as to be prevented from further rearward movement;

said pin has a head portion and a shank having a smaller diameter than said head portion;

said support hole has a main hole extending in parallel to the axis of said pin for receiving the shank of said pin, a recess for receiving the head portion of said pin, and a subsidiary hole formed continuous with said head portion on at least one side thereof in the rotational direction of said drive clutch member for permitting pivotal movement of said pin;

said main hole and said subsidiary hole are opened at a front surface of said drive clutch member, and said recess being opened at a rear surface of said drive clutch member;

at said vertical position of said pin, said shank extends from said front surface of said drive clutch member by a distance L2 for engagement with said driven clutch member in the rotational direction, and said head portion is positioned substantially flush with said rear surface, so that at the pivoted position of said pin, the shank extends from said front surface of said drive clutch member by a distance L3 which is smaller than said distance L2, and said head portion extends from said rear surface by a distance L1 and is pressed on said abutting member, so that a reaction force is produced for moving said drive clutch member from said first position to said second position against the biasing force of said biasing means.

3. The clutch mechanism as defined in claim 2 wherein the relationship among said distances L1, L2 and L3 are determined as L1>L2−L3.

4. The clutch mechanism as defined in claim 2 wherein said head portion of said pin as well as said recess of said support hole for receiving said head portion has a circular configuration, and wherein said recess has a conical circumferential wall enlarged toward said rear surface, so that said head portion can be pivoted relative to said recess.

5. The clutch mechanism as defined in claim 2 wherein said head portion of said pin as well as said recess of said support hole for receiving said head portion has a hemispherical configuration, so that said head portion slidably contacts an inner wall of said recess during the pivotal movement.

6. The clutch mechanism as defined in claim 2 wherein said subsidiary hole is formed on both sides of said support hole in the rotational direction of said drive clutch member.

7. The clutch mechanism as defined in claim 2 wherein said drive clutch member has first clutch teeth formed on a front surface thereof, and wherein said driven clutch member has second clutch teeth formed on a rear surface thereof and engageable with said first clutch teeth, and wherein said distance L1 of said shank at said vertical position of said pin is determined to be slightly greater than the height of said first clutch teeth.

8. The clutch mechanism as defined in claim 7 wherein a plurality of said pins are disposed in a circumferential direction of said drive member, and wherein said pins and said first clutch teeth are positioned one after another.

9. The clutch mechanism as defined in claim 3 and further including a stopper sleeve mounted on said housing for abutting on a work so as to determine a driving depth of a screw into the work, wherein said driven clutch member has clutch teeth formed on a rear surface thereof for engagement with said pin, and wherein a space having a distance L4=L1 −(L2−L3) is formed between said pin and said clutch teeth when said drive clutch member is moved from said second position to said first position after the spindle has reached a position where the spindle cannot be moved further toward the work and where the screw has been completely driven into the work.

10. In a power driven screwdriver including a housing, a spindle rotatably and axially movably disposed within the housing, and a motor for driving the spindle, a clutch mechanism interposed between the motor and the spindle comprising:

a drive clutch member rotatably driven by a motor and movable in an axial direction of the spindle between a first position and a second position positioned forwardly of said first position;

a driven clutch member rotatable and axially movable with the spindle, said driven clutch member being normally positioned in a forward position forwardly of said drive clutch member in said second position and being moved rearwardly from said forward position toward a rearward position for engagement with said drive clutch member when the spindle is pressed on a work;

an abutting member for abutment of said drive clutch member when said drive clutch member is positioned in said first position;

biasing means for normally biasing said drive clutch member rearwardly so as to hold said drive clutch member in said first position in abutment on said abutting member; and at least one shift member mounted on said drive clutch member and rotatable with said drive clutch member, said shift member being shiftable relative to said drive clutch member between an operational position and a non-operational position and being normally held in said non-operational position;

said shift member being brought to engage said driven clutch member in a rotational direction of said driven clutch member and being moved from said non-operational position to said operational position so as to move said drive clutch member from said first position to said second position when said drive clutch member is rotatably driven after said driven clutch member is moved from said forward position toward said drive clutch member in said first position through pressing the spindle on the work for driving a screw into the work; and said shift member being returned from said operational position to said non-operational position to move said drive clutch member from said second position to said first position when the pressing force applied to the spindle has been released after the screw has been driven.

11. The clutch mechanism as defined in claim 10 wherein said shift member is a pin having a longitudinal axis, said pin in said non-operational position extending substantially in parallel to an axis of the spindle and said pin in said operational position being inclined in the rotational direction of the spindle, said pin including a rear end protruding rearwardly from said drive clutch member as said pin is moved from said non-operational position to said operational position, so that said rear end of said pin abuts on said abutting member to move said drive clutch member from said first position to said second position.

12. The clutch mechanism as defined in claim 10 wherein said drive clutch member has first clutch teeth formed on a front surface thereof, and wherein said driven clutch member has second clutch teeth formed on a rear surface thereof and engageable with said first clutch teeth.

* * * * *